United States Patent
Kayser et al.

(10) Patent No.: US 7,487,900 B2
(45) Date of Patent: Feb. 10, 2009

(54) APPARATUS FOR DIFFUSION BONDING, BRAZING AND JOINING

(75) Inventors: Gregory F. Kayser, Woodland Hills, CA (US); Daniel L. Wisner, Valencia, CA (US); John G. Somerville, Simi Valley, CA (US); Jonathan H. Ferrin, Camarillo, CA (US)

(73) Assignee: The Boeing Company, Chicago, IL (US)

( * ) Notice: Subject to any disclaimer, the term of this patent is extended or adjusted under 35 U.S.C. 154(b) by 591 days.

(21) Appl. No.: 11/209,009

(22) Filed: Aug. 22, 2005

(65) Prior Publication Data

US 2007/0040008 A1 Feb. 22, 2007

(51) Int. Cl.
*B23K 37/00* (2006.01)
*B23K 20/00* (2006.01)
(52) U.S. Cl. .................. 228/44.3; 228/4.1; 228/193
(58) Field of Classification Search ................ 228/193, 228/194, 195, 212, 213, 44.3, 44.5, 4.1, 183
See application file for complete search history.

(56) References Cited

U.S. PATENT DOCUMENTS 3,862,489 A * 1/1975 Weisinger ............... 228/143

* cited by examiner

*Primary Examiner*—Kevin P Kerns
*Assistant Examiner*—Megha Mehta
(74) *Attorney, Agent, or Firm*—MacPherson Kwok Chen & Heid LLP; Don C. Lawrence

(57) ABSTRACT

Apparatus for diffusion bonding, brazing, or joining between respective surfaces of two parts, e.g., the exterior wall of a first annular cylinder and the interior wall of a concentric second annular cylinder, includes a cylindrical body having a circumferential cavity positioned between upper and lower ends thereof. A flexible annular membrane is disposed concentrically over the cavity, and respective upper and lower ends of the membrane are each sealingly hinged to the body. The body is assembled coaxially within the first cylinder, and the assembly then inserted coaxially into the second cylinder to the desired axial bonding position. The cavity is pressurized, causing the membrane, and responsively, the first cylinder, to expand radially within the second cylinder. The temperature of the parts is then raised and maintained for a selected period of time to bond the respective walls of the two cylinders to each other.

12 Claims, 4 Drawing Sheets

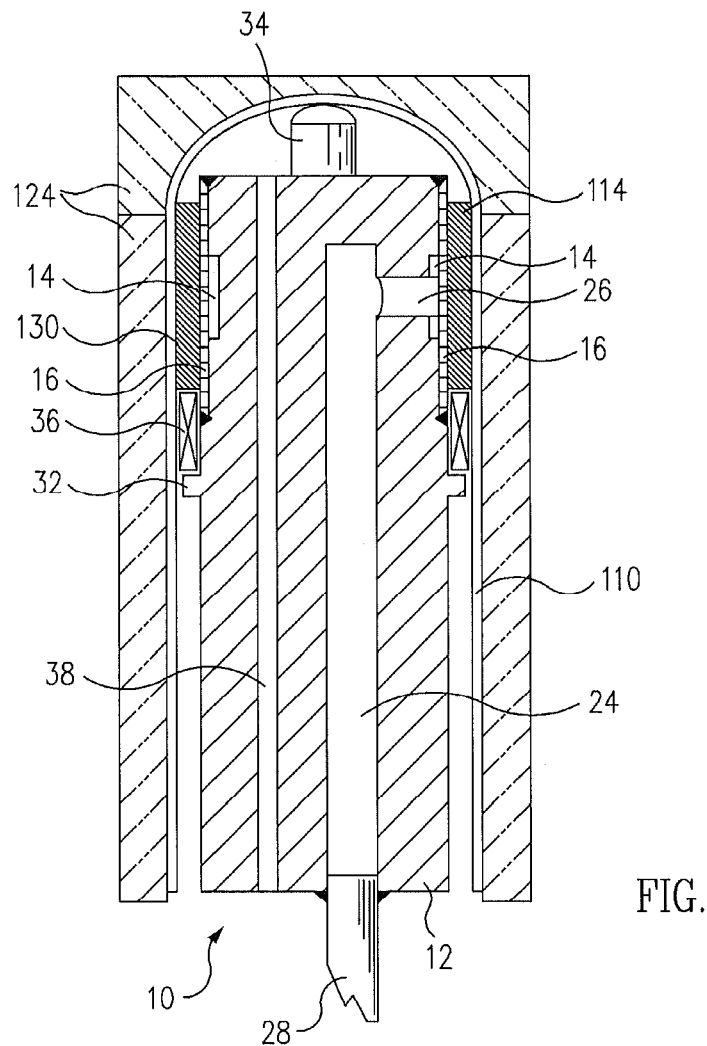
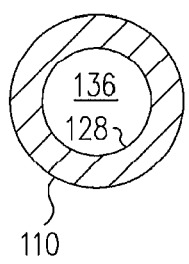
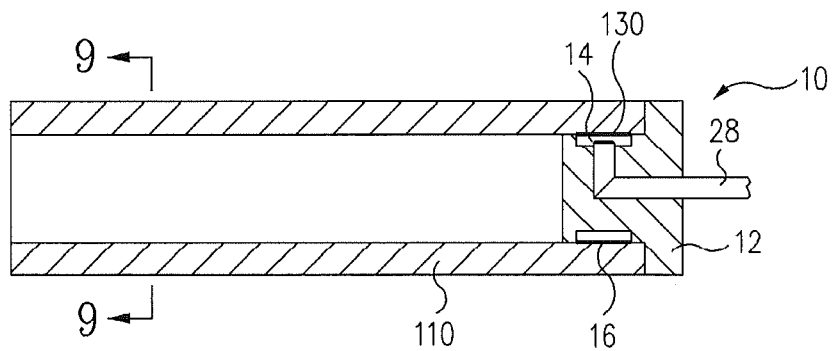
FIG. 7
FIG. 9
FIG. 8

APPARATUS FOR DIFFUSION BONDING, BRAZING AND JOINING

TECHNICAL FIELD

This invention relates to manufacturing tooling and processes in general, and in particular, to a method and apparatus for effecting a reliable, void-free diffusion bond or brazed joint between the surfaces of two parts, for example, the exterior wall of a first annular cylinder and the interior wall of a concentric second annular cylinder.

BACKGROUND

The need to bond the respective curved or flat planar surfaces of two parts together occurs frequently in many and diverse manufacturing areas, and arises independently of the type of materials involved or the particular application at hand. For example in the case of a Stirling engine, it is desirable to effect a virtually void-free bonding joint between the annular "acceptor" or heat exchanger, of the engine and the upper end of the "heater head" cylinder.

The Stirling engine was developed in England in about 1816 as a safer alternative to the steam engines of the time, and operates by alternately heating and cooling a fixed quantity of a working gas, e.g., air, hydrogen or helium, between two temperature extremes. Over the years, many variations of the Stirling engine have been developed, depending on the particular application at hand, and numerous examples of these may be found in the patent literature, e.g., U.S. Pat. No. 4,055,953 to Nederlof; U.S. Pat. No. 4,381,648 to Balas, Jr.; Pat. No. Re. 30,176 to Beale; and, U.S. Pat No. 4,602,174 to Redlich.

One such variant comprises a single-cylinder, free-piston Stirling engine driving a linear electric alternator. The engine includes a relatively large-volume "displacer" that fits loosely within the engine's single cylinder and functions only to displace the fixed quantity of working gas contained in the cylinder between the "heater head," or heat-input end of the cylinder, and the heat-output, or heat sink end of the cylinder, during which flow, the working gas is caused to pass through an annular "acceptor," or heat exchanger, located in the upper end of the heater head of the engine.

Stirling engines have numerous advantages relative to other engine types, including that they can utilize external sources of heat energy that do not require the combustion of a fuel with oxygen, e.g., radioisotopes, such as plutonium, making them particularly suitable for electrical power generation applications in deep space probes. However, due to their particular nature, Stirling engines also include certain drawbacks, among which is that they require both input and output heat exchangers, the efficiency of which must be optimized with some care to achieve maximum engine effectiveness. For example, the quality of the bond joint between the exterior wall of the annular heat exchanger and the interior wall of the upper end of the heater head of the engine can dramatically affect the heat transfer capability, and thus, the efficiency, of the heat exchanger.

Hence, there is an important need in a wide variety of fields in general for simple, inexpensive methods and apparatus for effecting reliable, void-free bonds between the respective surfaces of two parts, and in particular for effecting a diffusion bonded or brazed joint between the exterior wall of a first annular cylinder, such as a heat exchanger of a Stirling engine, and the interior wall of a concentric second annular cylinder, such as the heater head of such an engine.

BRIEF SUMMARY

In accordance with the various exemplary embodiments thereof described herein, methods and apparatus are provided for effecting reliable, void-free bonds between respective surfaces of two parts, and in one particular embodiment, for effecting a void-free diffusion bonded or brazed joint between the exterior wall of a first annular cylinder and the interior wall of a concentric second annular cylinder.

In one exemplary embodiment thereof, the apparatus comprises a cylindrical body having a circumferential cavity positioned between upper and lower ends thereof. A flexible annular pressure skin, or membrane, is disposed concentrically over the cavity, and respective ones of the upper and lower ends of the membrane are sealingly hinged to the body, e.g., with pleated, or bellows-like structures, for radial expansion and contraction of the membrane relative to the body in response to pressurization/depressurization of the cavity. Preferably, the axial length of the annular membrane is equal to or somewhat greater than the axial length of the first annular cylinder. Conduit means, such as intersecting radial and axial bores, are provided for conveying a pressurized fluid, e.g., air or helium, to and from the cavity for pressurization/depressurization thereof.

A radial flange can be disposed at the lower end of the body and arranged to contact a lower end of the first annular cylinder, and thereby position the cylinder such that it is axially centered with respect to the annular membrane. Means can also be provided for limiting the axial depth to which the cylindrical body and apparatus can be inserted into the second annular cylinder, such as an axial protrusion on the upper end of the cylindrical body that contacts an upper end of the second annular cylinder when the first cylinder is located at the desired axial bonding position. Additionally, means can be provided for equalizing the pressure between the upper and lower ends of the first cylindrical body when the body is axially inserted into or removed from the second annular cylinder.

An exemplary method for using the apparatus to join an exterior wall of a first annular cylinder to an interior wall of a second annular cylinder comprises assembling the cylindrical body of the apparatus coaxially within the first cylinder, such that the radially expansible membrane is disposed concentrically within the interior wall of the cylinder and the cylinder is about axially centered on the membrane. The resulting assembly is then inserted axially into the second cylinder to the desired axial bonding position. The cavity is pressurized, e.g., with a gas or liquid, causing the membrane, and responsively, the first cylinder, to expand radially within the second cylinder and forcefully engage the opposite, interior wall of the second cylinder. While the selected pressure is maintained in the cavity, the temperature of the two cylinders is then raised to and maintained at a selected temperature for a selected period of time until a void-free diffusion bond is effected between the respective walls of the two cylinders. Alternatively, the respective walls of the two cylinders can be brazed together at a relatively lower temperature using the same apparatus and an appropriate conventional brazing compound disposed between the cylinder walls.

In another exemplary embodiment, the apparatus of the invention can be used to form a permanent cap, or closure, at the end of a tube. In yet another embodiment, the apparatus can be used to form a temporary bond and used as a mechanical test grip, e.g., for gripping a tube in a tensile test. In still yet another embodiment, the apparatus of the invention can be used more generally to bond or braze the respective surfaces of two parts together and/or to thermoform relatively thin, sheets or planar structures.

A better understanding of the above and many other features and advantages of the methods and apparatus of the invention may be obtained from a consideration of the detailed description below of some exemplary embodiments thereof, particularly if such consideration is made in conjunction with the appended drawings, wherein like reference numerals are used to identify like elements illustrated in one or more of the figures therein.

BRIEF DESCRIPTION OF THE DRAWINGS

FIG. 7 is a partial cross-sectional elevation view of another exemplary embodiment of apparatus for bonding an exterior wall of a first annular cylinder to an interior wall of a second annular cylinder in accordance with the present invention;

FIG. 8 is a cross-sectional side elevation view of another exemplary embodiment of an apparatus in accordance with the present invention, showing the apparatus being used as a permanent cap or closure of a tube;

FIG. 9 is a cross-sectional view of the tube of FIG. 8, as viewed along the section lines 9-9 therein;

DETAILED DESCRIPTION

Figure 1:
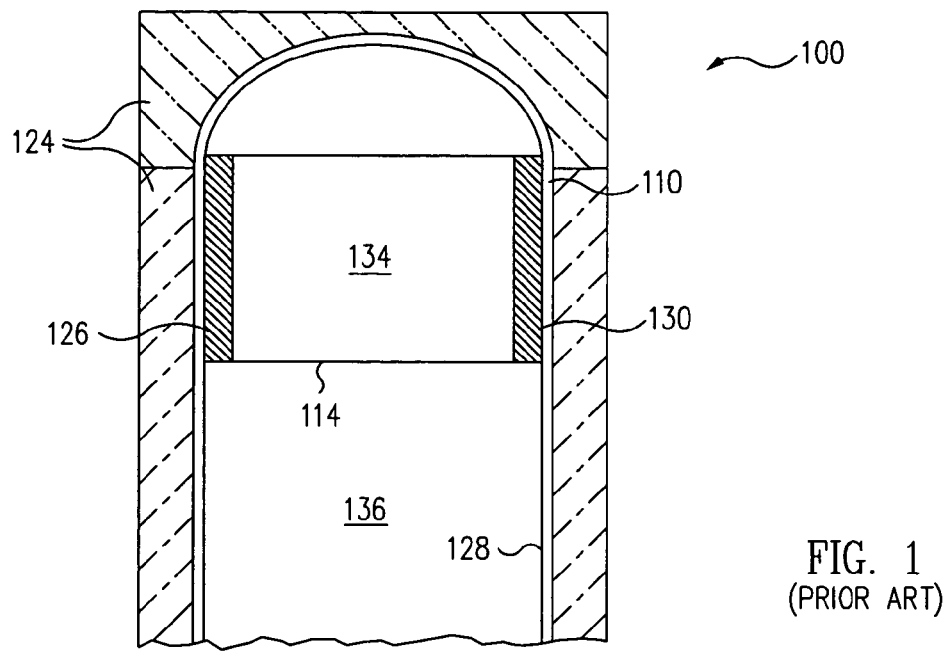
FIG. 1 is a partial cross-sectional elevation view of annular heater head portion of a Stirling engine, showing an annular heat exchanger having an exterior sidewall bonded to an interior sidewall of the annular heater head at an upper end portion thereof.

In FIG. 1, a heater head portion 110 of a Stirling engine 100, showing the head encased within a heat jacket 124, and an annular "acceptor" or heat exchanger 114, having an exterior sidewall 126 bonded to an interior sidewall 128 of the heater head in the upper end portion thereof, is illustrated in the partial cross-sectional elevation view. It may be noted that the heat exchanger generally corresponds to a first, open-ended tube, or annular cylinder, and the heater head corresponds to a second, closed-ended tube, or annular cylinder.

Thus, in a more generalized sense one aspect of, the present invention provides methods and apparatus for effecting a reliable, void-free bond, i.e., a diffusion-bonded or brazed joint 130 between the exterior wall of a first annular cylinder and the interior wall of a concentric second annular cylinder.

Figure 2:
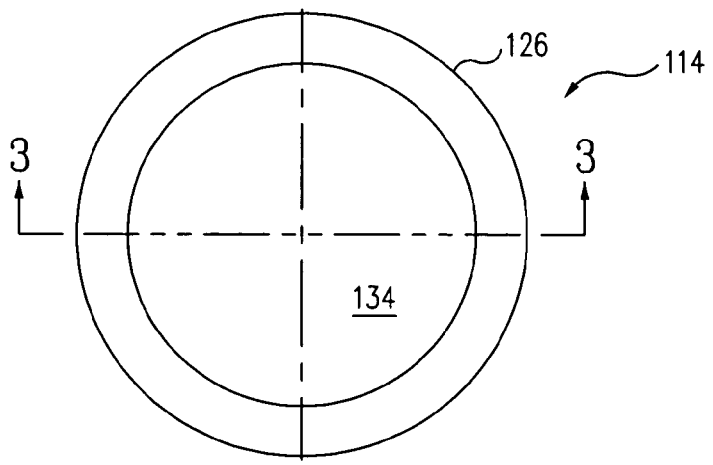
FIG. 2 is an enlarged end view of the annular heat exchanger of FIG. 1.
Figure 3:
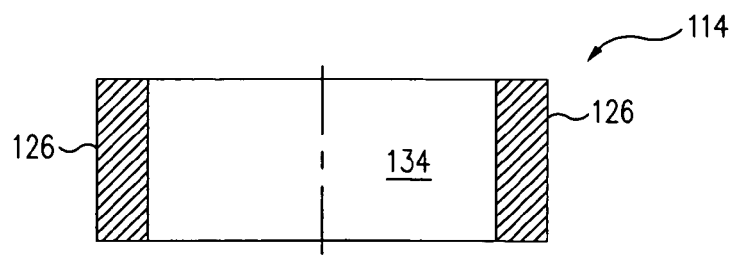
FIG. 3 is a cross-sectional elevation view of the heat exchanger of FIG. 2, as viewed along the section lines 3-3 therein.

An enlarged end view and a cross-sectional elevation view of the heat exchanger 114 are illustrated in FIGS. 2 and 3, respectively. With reference to FIG. 1, it may be seen that, as a displacer (not illustrated) of the Stirling engine 100 moves axially through the annulus 134 of the heat exchanger, the working gas in the cylinder of the engine is caused to flow predominantly through the heat exchanger, thereby substantially increasing the area of the heater head 110 in contact with the gas, and hence, the amount of heat transferred to the gas.

Because of the relatively large temperatures involved at the heat input end of the Stirling engine 100, the materials of both the heater head 110, the heat jacket 124, and the heat exchanger typically comprise a ceramic or an alloy of a metal capable of withstanding high temperatures, such as an alloy of nickel. As discussed below, alloys of nickel have excellent heat transfer coefficient and parts made thereof are particularly well adapted to being joined by diffusion bonding or brazing techniques. However, it should be understood that the methods and apparatus of the present invention are not limited to such materials, but have application to a much wider range of materials, e.g., polymers, pressures, temperatures and bond types.

Figure 4:
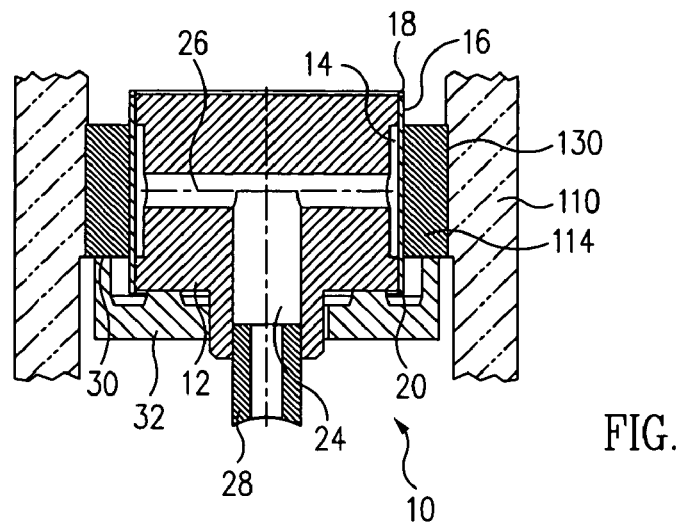
FIG. 4 is a partial cross-sectional elevation view of an exemplary embodiment of apparatus for bonding an exterior wall of a first annular cylinder to an interior wall of a second annular cylinder in accordance with the present invention.

An exemplary embodiment of a tool or apparatus 10, particularly adapted for forming a bonded joint 130 between an exterior wall 126 of a first annular cylinder 114 and an interior wall 128 of a second annular cylinder 110, is illustrated in the partial cross-sectional elevation view of FIG. 4. In the particular embodiment illustrated, the apparatus comprises a metal, e.g., stainless steel, cylindrical body 12 having a circumferential cavity 14 positioned between respective upper and lower ends of the body, and a flexible, metal, annular "pressure skin" or membrane 16, disposed concentrically over the cavity. Means are provided, as discussed below, for sealingly hinging respective upper and lower ends 18 and 20 of the membrane to the body for radial expansion and contraction of the membrane relative to the cylindrical body in response to pressurization and depressurization of the cavity, respectively.

Figure 5:
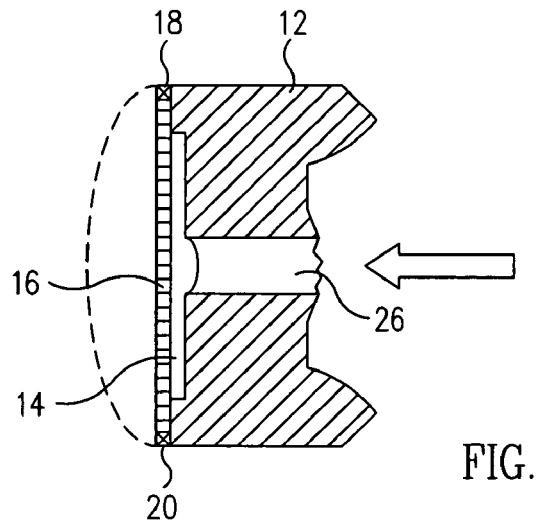
FIG. 5 is an enlarged partial cross-sectional elevation view of the apparatus of FIG. 4, showing an annular expansion membrane having upper and lower ends sealingly hinged to a cylindrical body of the apparatus for radial expansion and contraction of the membrane relative to a circumferential cavity therein.
Figure 6:
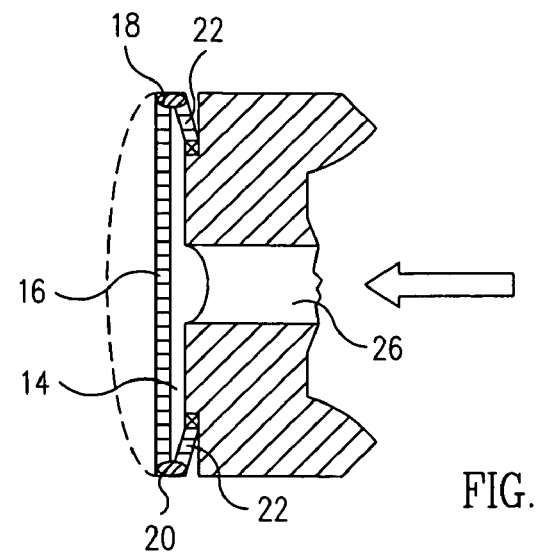
FIG. 6 is an enlarged partial cross-sectional elevation view similar to FIG. 5, showing an alternative attachment of upper and lower ends of the expansion membrane to the body.

Alternative exemplary embodiments of the membrane 16 sealing-and-hinging means are illustrated in the partial cross-sectional elevation views of FIGS. 5 and 6, respectively. As illustrated in the embodiment of FIG. 5, a sealed hinge can be effected at the upper and lower circumferential margins of the membrane by simply bonding, e.g., with a Gas Tungsten Arc Welding ("GTAW") process, respective ones of the circumferential upper and lower ends 18 and 20 of the membrane directly to the cylindrical body 12. As a result, a sealed hinge is formed at each end of the membrane that defines a single fold or "pleat," to which the membrane and the body each contributes a portion. The sealed hinges enable the membrane to expand radially, as indicated by the dashed line in FIG. 5, in response to the introduction of a pressurized fluid into the circumferential cavity 14, as indicated by the large arrow therein.

In the alternative embodiment of FIG. 6, the sealed hinges at the upper and lower ends 18 and 20 of the membrane 14 and the cylindrical body 12 are effected (e.g., by GTAW) through an intermediate pleat 22 that adds an additional fold to the bellows-like hinging arrangement of FIG. 5, thereby resulting in a flatter profile of the membrane when it is expanded, as indicated by the dashed line of FIG. 6. Those of skill in this art will appreciate that any reasonable number of additional pleats can be added to the bellows structure to enhance this flattening effect.

As those of skill in the art will also appreciate, the expanding membrane 16 of the apparatus 10 functions to expand the first annular cylinder 114 radially within the annulus 136 of the second annular cylinder 110, thereby forcing the exterior wall 126 of the former into forceful engagement with the interior wall 128 of the latter, so as to effect a void-free diffusion bond joint 130 between the two walls at an elevated temperature. Because the center portion of the membrane expands to a greater extent radially than the upper and lower end-portions thereof, as indicated by the dashed lines of FIGS. 5 and 6, it is desirable that the axial length of the annular membrane, and hence, the cylindrical body 12, be at least equal to or preferably, somewhat greater than that of the first annular cylinder, so that the radial force minimally necessary to effect a reliable bond at the upper and lower ends of the cylinder is present when the membrane is expanded. The foregoing effect and resulting length requirement are proportionately reduced, of course, by membranes that are sealingly hinged to the cylindrical body 12 by bellows-like structures having multiple pleats, such as that illustrated in FIG. 6, for the reason discussed above.

In the exemplary embodiment of the apparatus 10 of FIG. 4, means are provided for conveying a pressurized fluid, e.g., high-pressure air, Argon, Nitrogen or the like, to and from the circumferential cavity 14 so as to cause the membrane to expand and contract radially relative to the cylindrical body in response thereto. In the illustrated embodiment, these means comprise an axial bore 24 and a radial bore 26 that intersects both the axial bore and the cavity formed in the cylindrical body 12. The conveying means may additionally include a conduit 28, such as a length of high-pressure tubing, joined to an end of the axial bore, e.g., by bonding or brazing.

Additionally, the apparatus 10 may advantageously further include a radial lip or flange 30 disposed at a lower end portion of the cylindrical body 12 and arranged to contact a lower end of the first annular cylinder 114 and thereby position the cylinder axially relative to the annular membrane 16, preferably such that the middle of the cylinder is disposed in approximate alignment with the middle of the membrane. In the exemplary embodiment of FIG. 4, the radial flange is formed on a disc-like structure 32 held to the lower end of the cylindrical body by, e.g., removable fasteners (not illustrated), so that the flanged structure can be conveniently removed and replaced with another such structure having a flange with a different axial length. This enables the same tool 10 to accommodate cylinders 114 of various lengths.

A second exemplary embodiment of an apparatus 10 in accordance with the present invention is illustrated in the partial cross-sectional elevation view of FIG. 7, wherein features and elements like those discussed above in connection the embodiment of FIG. 4 are identified by like reference numerals. As illustrated in FIG. 7, in addition to a cylindrical body 10 having a greater length than that of the embodiment of FIG. 4, the second embodiment also includes a means for limiting the axial depth to which the body, and hence, the first annular cylinder 114, can be inserted into the second annular cylinder 110. In the particular embodiment illustrated, these limitstop means comprise an axial protrusion 34 disposed on the upper end of the cylindrical body that contacts an upper end of the second annular cylinder 110 and thereby prevents further axial travel of the cylindrical body into the second cylinder. The axial length of the protrusion can be made adjustable, e.g., by a lockably threaded coupling to the body, to enable the insertion depth of the apparatus into the second cylinder to be selectably adjusted.

In the second exemplary embodiment of FIG. 7, the radial flange for positioning the first annular cylinder 114 with respect to the expansible membrane 16 is made integral to the cylindrical body 12, and its axial position is rendered "adjustable" by the provision of an annular spacer 36 disposed between the flange and the lower end of the first cylinder. Thus, by varying the length of the spacer used, the axial position of the first cylinder relative to the membrane can be simply and accurately controlled. By using the spacer in combination with the adjustable protrusion 34 described above, the axial position of the first cylinder relative to the second cylinder 110 can be also be simply and accurately controlled.

As those of skill will understand, if the upper end of the second annular cylinder 110 is closed, as occurs in the closed-ended heater head of a Stirling engine, and if the clearance between the exterior wall 126 of the first cylinder 114 and the interior wall 128 of the second cylinder is small, the insertion or removal of an assembly of the first cylinder, when mounted coaxially on the apparatus 10, can experience a resistance to insertion or withdrawal that is a result of a compression or expansion of any gas, such as air, enclosed in the space above the assembly. This might result in a jamming or misalignment of the first cylinder. To prevent this problem, the apparatus 10 of FIG. 7 is provided with means for equalizing the pressure between the upper and lower ends of the body when the assembly is inserted into or removed from the second annular cylinder, which equalizing means can comprise a simple axial bore 38 in the cylindrical body 12 that extends between its upper and lower ends.

An exemplary method for using the apparatus 10 to join an exterior wall 126 of a first annular cylinder 114 to an interior wall 128 of a second annular cylinder 110 comprises assembling the cylindrical body 12 of the apparatus coaxially within the first cylinder, such that the radially expansible membrane 16 is disposed concentrically within the interior wall of the first cylinder and the cylinder is approximately axially centered on the membrane. The resulting assembly is then inserted axially into the second cylinder to the desired axial bonding position, which can be selectably adjusted as described above. The cavity 14 of the body is pressurized, e.g., with a gas or liquid, to a selected elevated pressure, causing the membrane, and responsively, the first cylinder, to expand radially within the second cylinder, as above. While the pressure in the cavity is maintained at the selected pressure, the temperature of the two cylinders is then raised, for example, by heating the assembly in an oven, to a selected, elevated temperature. The temperature is maintained for a selected period of time until respective molecules of the two parts diffuse into each other and form a void-free diffusion bond between the respective walls of the two cylinders, without the need for a filler material in the bond.

Alternatively, the respective walls of two concentric cylinders made of dissimilar materials or which are not diffusible within each other can be still be diffusion brazed or conventionally brazed together at the same, or even a relatively lower temperature, using the same apparatus and an appropriate brazing compound disposed between the walls of the cylinders. The brazing compound may be applied, e.g., to the exterior wall of the first cylinder, by conventional brushing or spraying methods, or alternatively, in the form of thin, annular "preforms" or foils.

The bonding operation may be effected in a vacuum or in an atmosphere appropriate to the particular materials being joined, such as an inert atmosphere, e.g., Argon, or alternatively, in a reducing atmosphere, e.g., an atmosphere containing hydrogen.

In an exemplary application of the method and apparatus in the construction of a Stirling engine of the type described above, the first and second annular cylinders can respectively comprise an acceptor or heat exchanger of the engine, made of Nickel, e.g., Ni-201, and a heater head of the engine made of another Nickel alloy, e.g., a "superalloy." In such an embodiment, the exterior wall of the heat exchanger can be effectively diffusion-bonded to the interior wall of the heater head by pressurizing the cavity to a bonding pressure of between about 300 and 600 psi, heating the cylinder assembly to a temperature of between about 1900 and 2200° F., and holding the assembly at the elevated temperature for between about 1 and 4 hours.

Another exemplary application of the methods and apparatus of the present invention is illustrated in the exemplary embodiments of FIGS. 8 and 9. In this embodiment, the apparatus 10 is used to form a cap or closure for an open-ended tube 110. In use, the apparatus is inserted in an end of the tube and the pressure sleeve, or annular membrane 14 is expanded radially outward against the interior wall 128 of the tube such that the annular membrane engages the interior wall of tube with a selected pressure. If the closure is intended to remain in the tube permanently, a diffusion bond or brazed joint between the apparatus and the tube can be effected as above, or alternatively, in a lower-temperature application, as in the context of a plastic tube and apparatus, can be effected using, e.g., an epoxy or a pressure sensitive adhesive disposed between the respective surfaces.

In a non-permanent application of the closure technique above, the apparatus 10 can be used, e.g., as a "pick-and-place" gripper tool for tubes, in which the apparatus is first inserted in the end of the tube 110 and the membrane 14 expanded as above to grip the tube. The tube is then picked up from a first location with the apparatus and deposited at a second location, where the membrane is then contracted by removing the pressurization in the cavity 16, thereby releasing the tube at the second location.

Figure 11:
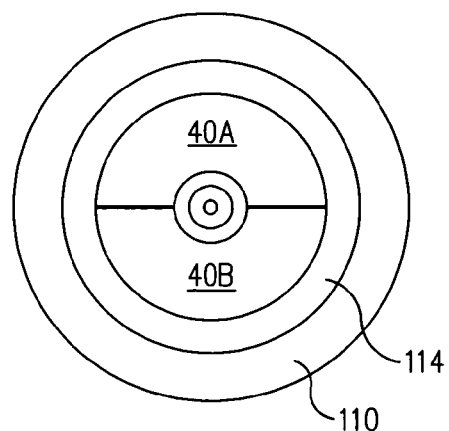
FIG. 11 is an end view of the apparatus of FIG. 10, as viewed along the section lines 10-10 therein; and, FIG. 12 is an exploded cross-sectional view of another exemplary embodiment of an apparatus in accordance with the present invention.
Figure 10:
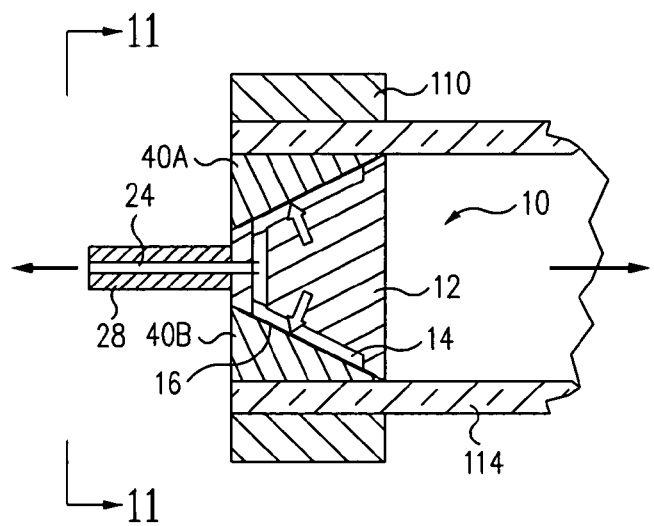
FIG. 10 is cross-sectional view of another exemplary embodiment of an apparatus in accordance with the present invention, showing the apparatus being used as a mechanical tensile-test grip.

Another exemplary gripping application of the methods and apparatus 10 of the present invention that is similar to the above technique is illustrated in FIGS. 10 and 11, viz., in a mechanical test grip for, e.g., a tube tensile tester. In this embodiment, the first annular cylinder 114 comprises a tubular test specimen, and the second annular cylinder 110 comprises a support collar. The shape of body 12 of the apparatus is modified to take a frustoconical form and is augmented by a plurality, e.g., a pair of jaws 40A and 40B of a split load ring 40 having complementary tapered internal walls and disposed concentrically between the expansible membrane 14 of the apparatus and the internal wall of the tubular test specimen. When the membrane is expanded radially, the jaws of the apparatus grip the tube tightly, thereby enabling tensile test forces to be applied to the tube in the direction of the arrows, to test, e.g., elongation parameters of the tube.

Figure 12:
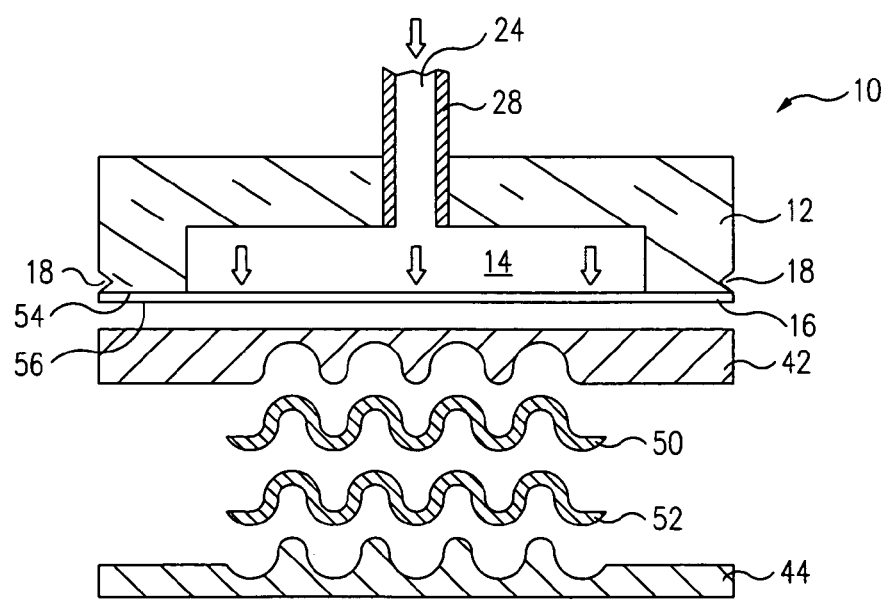

Another, more generalized, exemplary application of the methods and apparatus 10 of the present invention is illustrated in the exploded view of FIG. 12. In this embodiment, the apparatus has been "developed" into a generally planar embodiment that is applicable to bonding a surface of a first part 50 to a surface of a second part 52, in which the configuration of the parts to be bonded is not limited to cylindrical or annular forms. In this embodiment, the body 12 of the apparatus includes a generally flat surface 54 having cavity 16 opening to it. The pressure skin comprises a flexible planar membrane 14 having a first surface disposed over the cavity and an opposite second surface 56. As in the above embodiments, a sealing hinge is formed between an outer periphery of the membrane and an outer periphery of the flat surface of the body for expansion and contraction of the membrane relative to the body, and as above, the sealing-and-hinging means can comprise a bellows having one more pleats 18. Means, such as a conduit 24 and a pressure tube 28, are also provided for conveying a pressurized fluid to and from the cavity such that the membrane respectively expands away from and contracts toward the body in response thereto, as in the above embodiments.

In one exemplary method of application of the apparatus 10, the apparatus is augmented by first and second bonding and/or forming "mandrels" 42 and 44. The first mandrel 42 has opposite first and second surfaces, the first being substantially planar and disposed in parallel abutment with the second surface 56 of the expansible membrane 16. The second mandrel 44 also has opposite first and second surfaces, the first being disposed in an opposing relationship with the second surface of the first mandrel, with at least one of the first and second parts 50 and 52 sandwiched therebetween. Thus, in one variation, the apparatus can be used, e.g., to bond the first part to the second mandrel, utilizing one of the several bonding techniques described above. Alternatively, the apparatus can be used to bond the first part to the second part, as illustrated, by sandwiching both parts between the two mandrels before the application of bonding pressure, and optionally, heating of the assembly. In yet another variation in which the second surface of the first mandrel is configured to engage the first surface of the second mandrel in a complementary engagement, the apparatus can be used to bond and/or to form, using pressure and/or temperature, one or both of the parts to conform to the complementary opposing surfaces of the two mandrels.

By now, those of skill in this art will appreciate that many modifications, substitutions and variations can be made in and to the materials, apparatus, configurations and methods of the present invention without departing from its spirit and scope. Accordingly, the scope of the present invention should not be limited to the particular embodiments illustrated and described herein, as they are merely exemplary in nature, but rather, should be fully commensurate with that of the claims appended hereafter and their functional equivalents.

What is claimed is:

1. Apparatus for bonding an exterior wall of a first annular cylinder to an interior wall of a second annular cylinder, comprising:

a cylindrical body having a circumferential cavity positioned between upper and lower ends thereof;

a flexible annular membrane disposed concentrically over the cavity;

means for sealingly hinging respective upper and lower ends of the membrane to the body for radial expansion and contraction of the membrane relative to the body; and, means for conveying a pressurized fluid to and from the cavity such that the membrane respectively expands and contracts radially relative to the body in response thereto.

2. The apparatus of claim 1, further comprising a radial flange disposed at a lower end portion of the body and arranged to contact a lower end of the first annular cylinder and thereby position the cylinder axially relative to the annular membrane.

3. The apparatus of claim 1, wherein the means for sealingly hinging the membrane comprise a circumferential pleat connecting each of the upper and lower ends of the membrane to the body.

4. The apparatus of claim 1, wherein the means for conveying the pressurized fluid comprise at least one of an axial bore and a radial bore in the cylindrical body.

5. The apparatus of claim 1, wherein an axial length of the annular membrane is equal to or greater than an axial length of the first annular cylinder.

6. The apparatus of claim 1, further comprising means for limiting the depth to which the cylindrical body can be axially inserted into the second annular cylinder.

7. The apparatus of claim 1, wherein the second annular cylinder has a closed end, and further comprising means for equalizing the pressure between the upper and lower ends of the cylindrical body when the body is axially inserted into or removed from the second cylinder.

8. The apparatus of claim 1, wherein the first and second annular cylinders respectively comprise a heat exchanger and a heater head of a Stirling engine.

9. The apparatus of claim 1, wherein the first and second annular cylinders respectively comprise a Ni 201 and a superalloy.

10. Apparatus for bonding a surface of a first part to a surface of a second part, comprising:

a body having a cavity opening to a generally flat surface thereof;

a flexible planar membrane having a first surface disposed over the cavity and an opposite second surface;

means for sealingly hinging an outer periphery of the membrane to an outer periphery of the flat surface of the body for expansion and contraction of the membrane relative to the body;

means for conveying a pressurized fluid to and from the cavity such that the membrane respectively expands away from and contracts toward the body in response thereto; and, a first mandrel having opposite first and second surfaces, the first surface being substantially flat and disposed in parallel abutment with the second surface of the membrane.

11. The apparatus of claim 10, further comprising a second mandrel having opposite first and second surfaces, the first surface being disposed in an opposing relationship with the second surface of the first mandrel, with at least one of the first and second parts disposed therebetween.

12. The apparatus of claim 11, wherein the second surface of the first mandrel is configured to engage the first surface of the second mandrel in a complementary engagement.

* * * * *